(12) United States Patent
Geynet et al.

(10) Patent No.: US 11,694,052 B2
(45) Date of Patent: Jul. 4, 2023

(54) CIRCUIT FOR A PASSIVE RADIO IDENTIFICATION TAG OPERATING IN A UHF BAND AND METHOD FOR OPERATING A CIRCUIT

(71) Applicant: ASYGN, Grenoble (FR)

(72) Inventors: Lionel D. Geynet, Aubais (FR); Nicolas Delorme, Grenoble (FR)

(73) Assignee: ASYGN, Grenoble (FR)

( * ) Notice: Subject to any disclaimer, the term of this patent is extended or adjusted under 35 U.S.C. 154(b) by 165 days.

(21) Appl. No.: 17/432,803

(22) PCT Filed: Feb. 19, 2020

(86) PCT No.: PCT/FR2020/050306
§ 371 (c)(1),
(2) Date: Aug. 20, 2021

(87) PCT Pub. No.: WO2020/174159
PCT Pub. Date: Sep. 3, 2020

(65) Prior Publication Data
US 2022/0215218 A1    Jul. 7, 2022

(30) Foreign Application Priority Data

Feb. 28, 2019 (FR) ...................................... 1902064

(51) Int. Cl.
G06K 19/07 (2006.01)
(52) U.S. Cl.
CPC ................................. *G06K 19/0723* (2013.01)
(58) Field of Classification Search
CPC .................................................. G06K 19/0723
(Continued)

(56) References Cited

U.S. PATENT DOCUMENTS 5,990,738 A * 11/1999 Wright .................. H03F 1/3247
330/149
6,720,866 B1    4/2004 Sorrells et al.
(Continued)

FOREIGN PATENT DOCUMENTS

CN    104361388 A    2/2015
FR     3015729 A1    6/2015
(Continued)

OTHER PUBLICATIONS

International Search Report and Written Opinion from PCT Application No. PCT/FR2020/050306, dated May 29, 2020.
(Continued)

*Primary Examiner* — Michael G Lee
*Assistant Examiner* — David Tardif
(74) *Attorney, Agent, or Firm* — Workman Nydegger

(57) ABSTRACT

A circuit, method, and system including the circuit such that the circuit is for a passive radio-identification tag operating in a UHF band and is configured for radio communication with a reader which sends a periodic read signal. A period of the read signal includes an energy recovery phase and a communication phase. The circuit has: a control device configured to accumulate an energy reserve from the radio wave during the energy recovery phase and to communicate with the reader during the communication phase, an interface to connect an external analog sensor. The interface includes: an electrical connection configured to connect and supply the external analog sensor with electricity and to acquire the analog measurement from the sensor, an amplifier configured to amplify the signal of the analog measurement from the sensor, and an analog-digital converter configured to digitize the amplified analog measurement from the sensor.

11 Claims, 2 Drawing Sheets

(58) Field of Classification Search
USPC .......................................................... 235/492
See application file for complete search history.

(56) References Cited

U.S. PATENT DOCUMENTS

| | | | |
|---|---|---|---|
| 9,789,738 | B2 | 10/2017 | Rokhsaz et al. |
| 2007/0146958 | A1* | 6/2007 | Babcock ................ H02P 7/281 |
| | | | 361/160 |
| 2008/0136619 | A1 | 6/2008 | Moran |
| 2010/0231407 | A1 | 9/2010 | Carr |
| 2012/0277830 | A1* | 11/2012 | Arfin .................. A61N 1/36146 |
| | | | 607/62 |
| 2013/0099897 | A1 | 4/2013 | Forster |
| 2019/0379288 | A1* | 12/2019 | Chaput ............. H02M 3/33584 |
| 2020/0196097 | A1* | 6/2020 | Hajimiri ................. H02J 50/20 |

FOREIGN PATENT DOCUMENTS

| | | |
|---|---|---|
| FR | 3058216 A1 | 5/2018 |
| WO | 2014167080 A1 | 10/2014 |

OTHER PUBLICATIONS

French Preliminary Search Report from FR Application No. FR1902064, dated Nov. 8, 2019.
Felini et al., "Fully RF Powered UHF-RFID Sensors Platform," Procedia Engineering, vol. 87, Sep. 7-10, 2014, pp. 1346-1349.

* cited by examiner

CIRCUIT FOR A PASSIVE RADIO IDENTIFICATION TAG OPERATING IN A UHF BAND AND METHOD FOR OPERATING A CIRCUIT

TECHNICAL FIELD

The invention relates to contactless devices, for example of RFID type, comprising sensors for recording events over a long period without needing an external power source. The invention relates especially to circuits for a passive radio-identification tag operating in a UHF band, configured for radio communication with a reader which sends a periodic read signal, in which a period of the read signal comprises an energy recovery phase and a communication phase.

PRIOR ART

As is known from the prior art, a circuit of RFID type ("Radio Frequency Identification") can act as radio tag (or "RFID tag") also called marker and is associated with an object to be monitored. The circuit comprises or is connected optionally via an interface to a sensor for measuring at least some physical parameters relative to this object such as for example ambient temperature, humidity or even acceleration.

The circuit is generally in the form of a self-adhesive label stuck onto the object to be monitored or perhaps in the form of a chip integrated into the object to be monitored. The object to be monitored is for example industrial equipment, merchandise, a product or living organism of which the surveillance via at least one measured physical parameter is necessary.

In general, such a sensor comprises a memory module capable of storing measurements acquired by the measuring module, an antenna capable of transmitting these measurements to an interrogator via electromagnetic signals and an electric power source for supplying especially the measuring module.

Such a system conventionally comprises a reader or RFID interrogator and a circuit (or tag) (or a plurality of circuits) attached or fixed to the object to be monitored. The RFID reader generally sends a UHF signal, called interrogation signal, to the RFID circuit. The use of UHF signals has the following advantages: high communication speed, possibility of communicating with a large number of tags simultaneously.

RFID tags used in these systems are conventionally passive tags, specifically they do not include a battery or power storage means. These tags use the energy contained in the carrier of the signal of the reader to send a modulated version of the signal from the reader to the RFID reader. At least some of the energy of the interrogation signal is recovered by an energy-collecting device to supply the components of the tag. The advantage of passive tags is that they are light and inexpensive and have a long shelf life.

A passive RFID tag is described for instance in document FR3015729 (A1) or by C. Felini et al. "Fully RF Powered UHF-RFID Sensors Platform", Procedia Engineering 87 (2014) 1346-1349. RFID tags are also known from US20080136619A1, US20130099897A1, U.S. Pat. No. 6,720,866B1, CN104361388A, U.S. Pat. No. 9,789,738B2, or US20100231407A1.

The combined use of UHF interrogation signals and passive tags does however have the disadvantage of having a short reading distance (above all in the event where the circuit is connected to a sensor), for example fewer than 20 cm, as the energy recovered by the passive tag is limited. In this context, the use of an external sensor connected to the circuit via an interface can consume most of the energy, especially if this sensor comprises discrete electronics (or digital components), the interface is a digital interface (for example SPI or I2C), and/or the channel for acquiring the signal from the external sensor consumes too much energy. In addition, the reading time can be very long, for example it can last over 500 ms. Also, a system comprising a circuit and an external sensor connected via an interface can be a large size, if a digital interface is used.

PRESENTATION OF THE INVENTION

The aim of the invention is to eliminate all or some of the above disadvantages, especially to allow a long reading distance, for example up to 3 meters, and a system comprising a circuit and an external sensor connected via an interface with reduced dimensions. Another aim of the invention however is complying with the EPC UHF Gen2 Air Interface Protocol.

For this purpose, the invention proposes a circuit for a passive radio-identification tag operating in a UHF band, configured for radio communication with a reader which sends a periodic read signal, in which a period of the read signal comprises an energy recovery phase and a communication phase. The circuit comprises: a control device configured to accumulate an energy reserve from the radio wave during the energy recovery phase and to communicate with the reader during the communication phase, an interface to connect (at least) an external analogue sensor. The interface comprises: an electrical connection configured to connect and supply the external analogue sensor with electricity and to acquire the analogue measurement from the sensor, an amplifier configured to amplify the signal of the analogue measurement from the sensor, and an analogue-digital converter (ADC) configured to digitise the amplified analogue measurement from the sensor, in which the energy recovery phase comprises an acquisition phase during which the interface supplies the external analogue sensor, acquires, amplifies and digitises the measurement from the sensor.

Consequently, due to such an interface, an analogue sensor can be connected directly to the circuit, which uses up less energy than a digital sensor which comprises additional electronic elements/circuits. Also due to the possibility of acquiring, amplifying and digitising the measurement from the sensor during the acquisition phase, which is during the energy recovery phase and therefore prior to the communication phase and therefore in a single period of the periodic read signal, this measurement can be sent to the reader directly during this communication phase, that is, during the same period. Consequently the response time of the circuit can be reduced. It is therefore possible to read (interrogate) several external circuits very quickly. For example, objects comprising circuits according to the invention can be positioned together in a box and each can be read very quickly. According to another example it is possible to measure the pressure of a tyre as the vehicle moves past a detector.

The control device can also be configured to: supply the interface to acquire the amplified and digitised measurement during the acquisition phase, and transfer the amplified and digitised measurement to the reader during the communication phase of the same period.

The control device can be configured to: start up during a start-up phase, the start-up phase being prior to the acquisition phase and during the same energy recovery phase.

Prior to the start-up phase the energy recovery phase can also comprise an initial energy recovery phase, during which the circuit is switched off and exclusively accumulates an energy reserve from the radio wave.

Consequently, a reliable start-up can be assured, as the level of accumulated energy is sufficiently high.

Between the start-up phase and the acquisition phase the energy recovery phase can also comprise a first intermediate energy recovery phase, during which the circuit is switched off and exclusively accumulates an energy reserve from the radio wave.

Consequently, reliable acquisition of the measurement can be assured, as the level of accumulated energy is sufficiently high.

After the acquisition phase and prior to the communication phase the energy recovery phase can also comprise a second intermediate energy recovery phase, during which the circuit is switched off and exclusively accumulates an energy reserve from the radio wave.

Consequently, reliable transmission of the measurement to the reader can be assured, as the level of accumulated energy is sufficiently high.

The control device is optionally configured to supply the interface exclusively during the acquisition phase.

Consequently, the analogue sensor can be supplied by the interface. Besides, if the interface is activated exclusively during the acquisition phase, energy consumption can be reduced.

The control device is optionally configured to supply the elements of the interface with electricity sequentially, for example to supply the electrical connection to connect the sensor, the amplifier and the analogue-digital converter (ADC) sequentially.

Consequently, as exclusively this element of the interface is supplied, which is a necessity at this time to acquire the measurement, energy consumption can be reduced.

The control device can therefore be configured to supply: first exclusively the electrical connection to supply the external analogue sensor and acquire the analogue measurement from the sensor, after exclusively the amplifier to amplify the signal of the analogue measurement from the sensor, and after exclusively the analogue-digital converter (ADC) to digitise the amplified analogue measurement from the sensor.

After digitising of the measurement by the analogue-digital converter (ADC) and during the acquisition phase, the digitised measurement is read and saved by the control device.

Therefore, the measurement is ready at the start of the communication phase to be transferred to the reader.

The circuit is for example compatible with (or communicates according to) the EPC UHF Gen2 Air Interface Protocol.

The invention also proposes a passive radio-identification system operating in a UHF band comprising: a reader configured to send a periodic read signal, a period of the read signal comprising an energy recovery phase and a communication phase, and a circuit as described hereinabove.

The invention also proposes a process for operating a circuit for a passive radio-identification tag operating in a UHF band and for reading the circuit by a reader, the circuit being connected to an external analogue sensor, in which the reader sends a periodic read signal, in which a period of the read signal comprises an energy recovery phase and a communication phase, the circuit accumulates an energy reserve from the radio wave during the energy recovery phase, and communicates with the reader during the communication phase, in which the external analogue sensor is supplied by the circuit during the energy recovery phase so that the circuit acquires, amplifies and digitises a measurement from the sensor during the same energy recovery phase.

The circuit can transfer the digitised measurement from the sensor to the reader during the communication phase which follows the energy recovery phase and is of the same period.

The characteristics and advantages of the invention will emerge from the following description given solely by way of non-limiting example and made in reference to the appended drawings.

DESCRIPTION OF EMBODIMENTS

Figure 1:
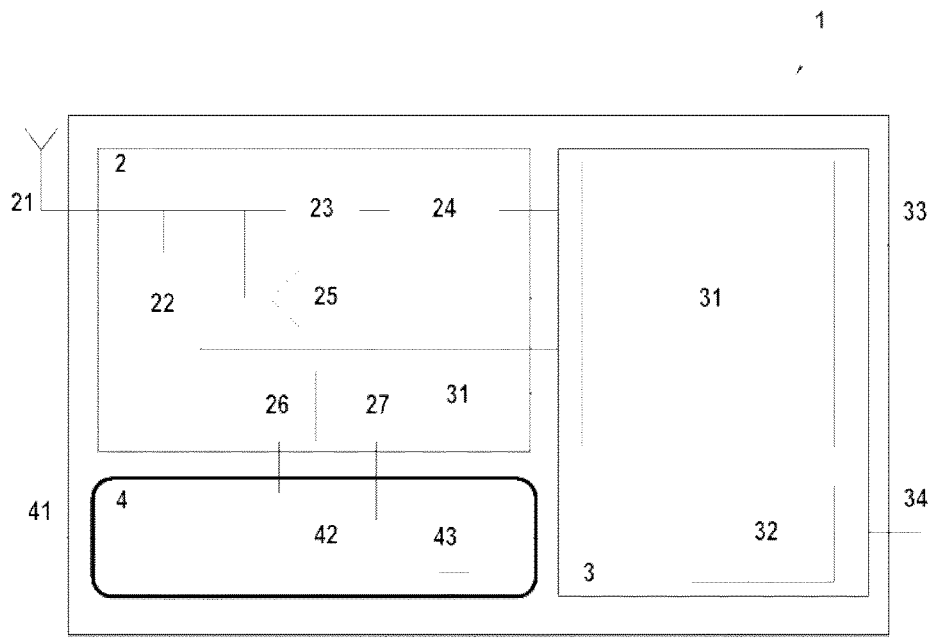
FIG. 1 is a schematic view of the architecture of a circuit according to the invention.

FIG. 1 is a schematic view of the architecture of a circuit 1 according to the invention. The circuit 1 is of RFID type ("Radio Frequency Identification") operating in a UHF band and can act as radio tag (or "RFID tag"). The circuit is for example compatible with (or communicates according to) the EPC UHF Gen2 Air Interface Protocol.

The circuit is for example in the form of a self-adhesive label stuck onto the object to be monitored or perhaps in the form of a chip integrated into the object to be monitored. The object to be monitored is for example merchandise, a product or a living organism of which monitoring is necessary via at least one measured physical parameter.

The circuit 1 operates passively, specifically it does not include a batter or energy storage means. But it does use the energy contained in the carrier of the signal of the reader to send back a modulated version of the signal of the reader to the RFID reader. At least some of the energy of the interrogation signal is recovered by an energy-collecting device to supply the components of the circuit. In detail:

The circuit 1 comprises an analogue module 2 which is connected to an antenna 21 to recover the energy received with the antenna by the radio wave sent by an external reader and to receive and transmit the communication signals.

For this purpose the analogue module 2 comprises a modulation unit 22 (for example for sending communication signals). It also comprises a demodulation unit 25 (for example to receive communication signals). It also comprises a rectification unit 23 and a supply control unit 24 to proceed with and/or to accumulate an energy reserve from the radio wave during the energy recovery phase. The rectification unit 23 can perform radio energy conversion into continuous energy to supply the circuit. Also, the supply control unit 24 can execute generation of "individual" continuous voltage to supply the acquisition chain (for example the interface) and also generation of continuous current to supply the acquisition chain. For example the accumulated energy can be stored in a capacitor (for example a condenser).

The analogue module 2 is connected to a digital module 3 (or control device 3). This digital module 3 comprises a processor and/or a storage unit 31 capable of processing data and/or storing measurements acquired by the sensor. Also, the digital module 3 optionally comprises a digital interface, for example a SPI or I2C. The digital module 3 controls the analogue module 2, for example to be supplied with accumulated energy and to communicate with the reader via the antenna 21. The accumulation, consumption and storage of energy is therefore controlled by the digital module 3 (cf. explanation for FIG. 2 hereinbelow).

The digital module 3 is also connected to an interface (or interface module) 4. The interface 4 comprises an electrical connection 41 configured to connect and supply an external analogue sensor with electricity and to acquire the analogue measurement from the sensor. It also comprises an amplifier 42 configured to amplify the signal of the analogue measurement from the sensor. It also comprises an analogue-digital converter (ADC) 43 configured to digitise the amplified analogue measurement from the sensor. The signal leaving the converter 43 is sent to the digital module 3 to be stored and sent to the reader. The converter can be connected to an oscillator 28 to receive a "CLK" signal.

The circuit can also comprise an internal analogue sensor 26 and/or an internal temperature sensor 27, which are connected to the converter 43, for example.

Figure 2:
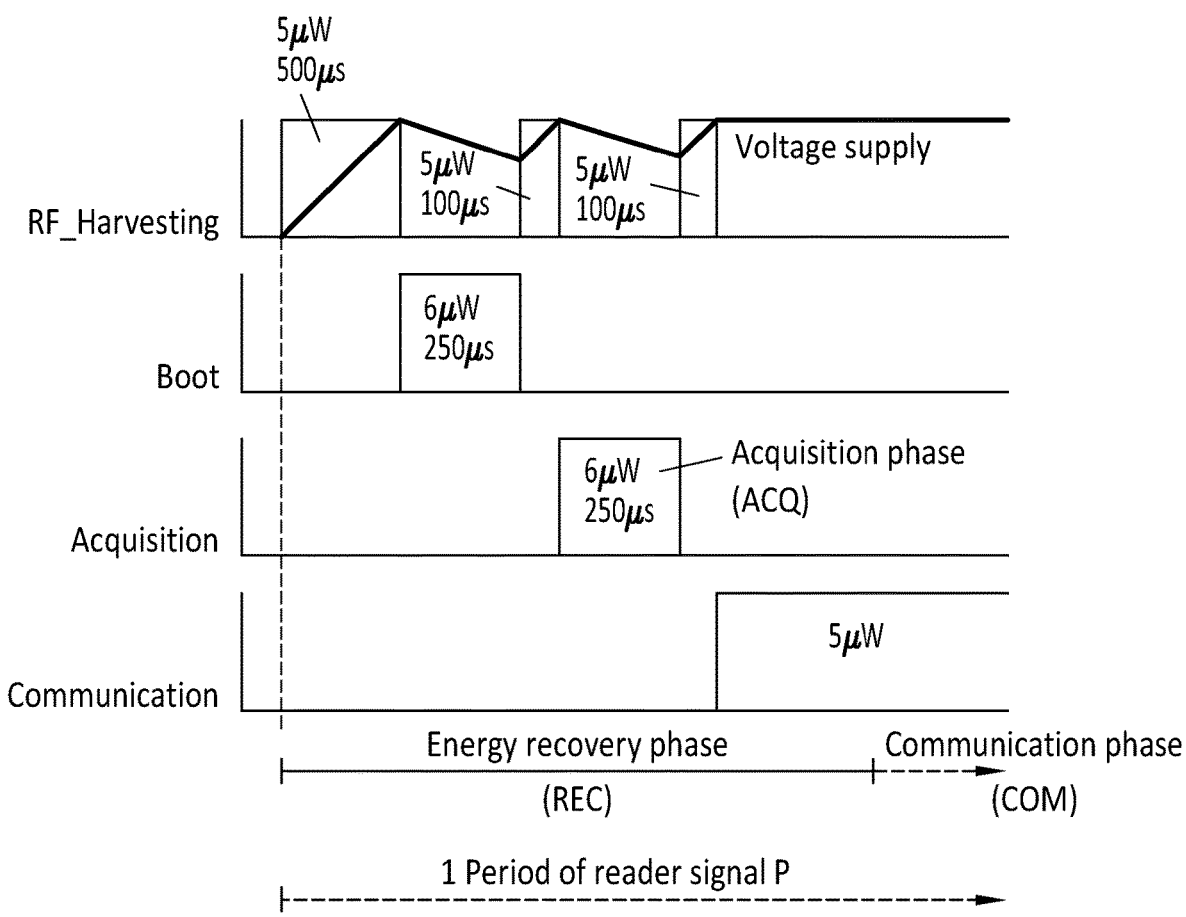
FIG. 2 is a schematic view of a diagram of the energy recovery phase according to the invention.

FIG. 2 is a schematic view of a diagram of the energy recovery phase according to the invention. The diagram indicates four activities (or 4 subcharts), the axes X of which indicate the time.

The external reader sends a periodic read signal. A period P of the read signal comprises an energy recovery phase REC and a communication phase COM. In the energy recovery phase REC an energy reserve is accumulated from the radio wave of the external reader. The energy recovery phase REC comprises the phases described hereinbelow.

As indicated in the "RF Harvesting subchart" the stored energy rises in an initial energy recovery phase (for example to 5 micro-watt during 500 micro-seconds), as no element or unit of the circuit is active and therefore all the energy is stored.

Afterwards, that is, when enough energy is stored to enable reliable operation, the digital module 3 is started up during a start-up phase ("Boot") (for example with a consumption of 6 micro-watt over 250 micro-seconds). At the same time, because of this operation of the digital module 3, the stored energy reduces.

For this reason, after the start-up phase the energy recovery phase comprises a first intermediate energy recovery phase, in which the stored energy increases again (for example to 5 micro-watt during 100 micro-seconds), as no element or unit of the circuit is active and therefore all the energy is stored.

Afterwards, that is, when enough energy is stored to enable reliable operation, the interface 4 supplies the external analogue sensor, acquires, amplifies and digitises the measurement from the sensor during the acquisition phase ("Acquisition") (for example with consumption of 6 microwatt during 250 micro-seconds). At the same time, because of this operation of the digital module 3, the stored energy reduces.

For this reason, after the acquisition phase, the energy recovery phase comprises a second intermediate energy recovery phase in which the stored energy rises again (for example to 5 micro-watt during 100 micro-seconds), as no element or unit of the circuit is active and therefore all the energy is stored.

Afterwards, (or after a predefined period) the energy recovery phase can be terminated and the communication phase COM can commence. During the communication phase, that is, during the same period, the measurement is transferred to the external reader.

Figure 3:
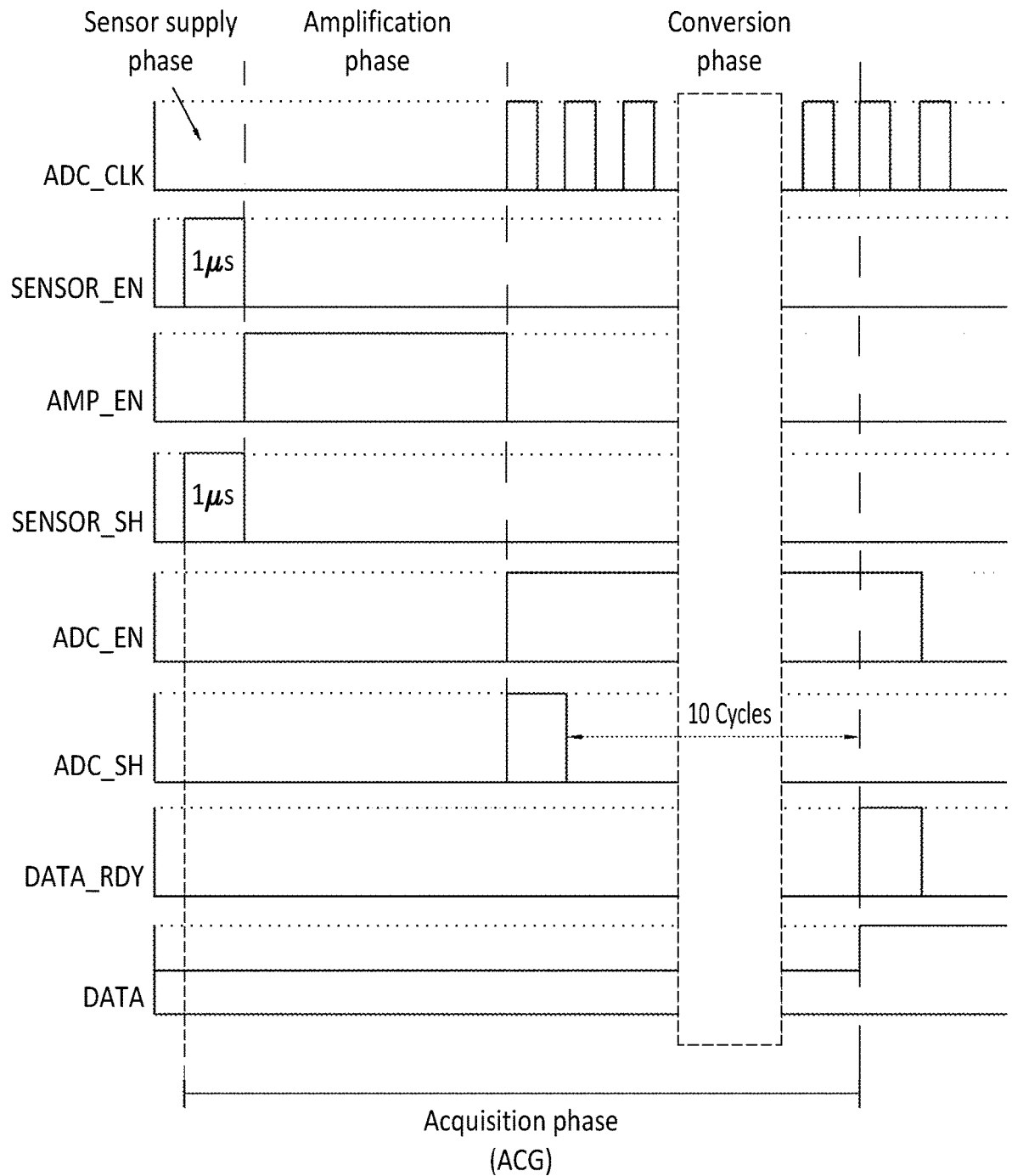
FIG. 3 is a schematic view of a diagram of the acquisition phase of the energy according to the invention.

FIG. 3 is a schematic view of a diagram of the energy acquisition phase ACQ according to the invention. The diagram indicates eight activities (or 8 subcharts), of which the axes X indicate the time. During the acquisition phase of the energy ACQ the elements of the interface 4 are supplied with electricity sequentially.

As indicated in the subchart "SENSOR_EN" at the start only the electrical connection and therefore the external analogue sensor are supplied with energy (for example for 1 micro-seconds) and the signal generated by the sensor is read and sampled. Afterwards, exclusively the amplifier 42 is supplied to amplify the signal of the analogue measurement from the sensor (cf. subchart "AMP_EN"). As a result, only the analogue-digital converter (ADC) 43 is supplied to digitise the amplified analogue measurement from the sensor (cf. subchart "ADC_EN"). After digitising of the measurement by the analogue-digital converter (ADC) and more preferably during the acquisition phase, the digitised measurement is read and saved by the processor 31, and therefore provided to the read digital module 3 (cf. subchart "DATA_RDY").

Because of this sequential operation, total consumption for acquiring the amplified and digitised measurement can be reduced, for example to 1 micro-watt. For this reason, acquisition and transmission of the measurement can be performed during a single period of the signal of the reader.

The invention claimed is:

1. A circuit for a passive radio-identification tag operating in a UHF band, configured for radio communication with a reader which sends a periodic read signal,
wherein a period of the read signal comprises an energy recovery phase and a communication phase,
the circuit comprising:
a control device configured to accumulate an energy reserve from the radio wave during the energy recovery phase and to communicate with the reader during the communication phase,
an interface to connect an external analogue sensor, the interface comprising:
an electrical connection configured to connect and supply the external analogue sensor with electricity and to acquire the analogue measurement from the sensor,
an amplifier configured to amplify the signal of the analogue measurement from the sensor, and
an analogue-digital converter configured to digitize the amplified analogue measurement from the sensor,
wherein the energy recovery phase comprises an acquisition phase during which the interface supplies the external analogue sensor, acquires, amplifies and digitizes the measurement from the sensor,
wherein the control device is also configured to:
supply the interface to acquire the amplified and digitized measurement during the acquisition phase, and
transfer the amplified and digitized measurement to the reader during the communication phase of the same period.

2. The circuit according to claim 1, wherein the control device is configured to:
start up during a start-up phase, the start-up phase being prior to the acquisition phase and during the same energy recovery phase.

3. The circuit according to claim 1, wherein prior to the start-up phase the energy recovery phase also comprises an initial energy recovery phase, during which the circuit is switched off and exclusively accumulates an energy reserve from the radio wave.

4. The circuit according to claim 2, wherein between the start-up phase and the acquisition phase the energy recovery phase also comprises a first intermediate energy recovery phase, during which the circuit is switched off and exclusively accumulates an energy reserve from the radio wave.

5. The circuit according to claim 2, wherein after the acquisition phase and prior to the communication phase the energy recovery phase also comprises a second intermediate energy recovery phase, during which the circuit is switched off and exclusively accumulates an energy reserve from the radio wave.

6. The circuit according to claim 1, wherein the control device is configured to supply the interface exclusively during the acquisition phase.

7. The circuit according to claim 1, wherein the control device is configured to supply the elements of the interface with electricity sequentially,
especially to supply the electrical connection to connect the sensor, the amplifier and the analogue-digital converter sequentially.

8. The circuit according to claim 1, wherein the control device is configured to supply:
first exclusively the electrical connection to supply the external analogue sensor and acquire the analogue measurement from the sensor,
after exclusively the amplifier to amplify the signal of the analogue measurement from the sensor, and
after exclusively the analogue-digital converter to digitize the amplified analogue measurement from the sensor.

9. The circuit according to claim 1, wherein after digitizing of the measurement by the analogue-digital converter and during the acquisition phase, the digitized measurement is read and saved by the control device.

10. A passive radio-identification system operating in a UHF band comprising:
a reader configured to send a periodic read signal, a period of the read signal comprising an energy recovery phase and a communication phase, and
a circuit according to claim 1.

11. A process for operating a circuit for a passive radio-identification tag operating in a UHF band and for reading the circuit by a reader, the circuit being connected to an external analogue sensor,
wherein the reader sends a periodic read signal,
wherein a period of the read signal comprises an energy recovery phase and a communication phase,
the circuit accumulates an energy reserve from the radio wave during the energy recovery phase, and communicates with the reader during the communication phase,
wherein the external analogue sensor is supplied by the circuit during the energy recovery phase so that the circuit acquires, amplifies and digitizes a measurement from the sensor during the same energy recovery phase,
wherein the circuit transfers the digitized measurement from the sensor to the reader during the communication phase which follows the energy recovery phase and is of the same period.

\* \* \* \* \*